United States Patent [19]

Young et al.

[11] 4,405,161

[45] Sep. 20, 1983

[54] WELLHEAD SECURITY APPARATUS

[75] Inventors: A. Steven Young; Gorby C. Mason, both of Garland, Tex.

[73] Assignee: A. Steven Young, Garland, Tex. ; a part interest

[21] Appl. No.: 271,832

[22] Filed: Jun. 9, 1981

[51] Int. Cl.³ .................. F16L 55/00; F16L 21/00; F16L 25/00

[52] U.S. Cl. .................................. 285/80; 285/45; 285/373; 285/419; 285/423; 285/DIG. 22; 70/158; 70/232; 137/382; 292/307 B

[58] Field of Search ............ 285/15, 45, 80, DIG. 22, 285/373, 419, 423; 70/158, 174, 178, 232; 137/382; 292/307 B, 317, 318

[56] References Cited

U.S. PATENT DOCUMENTS

| 754,256 | 3/1904 | Sullivan | 285/47 |
|---|---|---|---|
| 1,028,253 | 6/1912 | Murray | 285/80 X |
| 1,084,996 | 1/1914 | Wright | 70/178 |
| 1,903,581 | 4/1953 | Turner | 70/178 |
| 2,798,747 | 7/1957 | Auer | 286/7 |
| 2,889,885 | 6/1959 | Hildebrandt | 166/361 |
| 3,077,931 | 2/1963 | Shaffer et al. | 166/89 |
| 3,127,198 | 3/1964 | Orund | 285/146 |
| 3,437,149 | 4/1969 | Cugini et al. | 166/379 |
| 3,633,947 | 1/1972 | Nelson | 285/DIG. 22 |
| 3,752,192 | 8/1973 | Kleppin | 137/802 |
| 4,300,373 | 11/1981 | Camos et al. | 285/45 X |
| 4,326,740 | 4/1982 | Guiler | 292/307 B |

OTHER PUBLICATIONS

Advertisement for "Valveguard" by Seaboard Wellhead Control, Inc., Oil & Gas Journal, Dec. 1, 1981, p. 173.

Primary Examiner—Richard J. Scanlan, Jr.
Attorney, Agent, or Firm—Richards, Harris & Medlock

[57] ABSTRACT

Wellhead distribution valving (known in the trade as a Xmas tree) are protected from potential thieves by security apparatus that prevents access to the mounting flange bolts of the wellhead valving. This security apparatus comprises a housing having two similar half sections. Each half section includes an outer wall, a semi-annular top and a semi-annular bottom. A plurality of locking members are integrally attached to the outer wall at each half to mate with a locking receptacle attached to the inner surface of the outer wall of the mating half section. An inner core of a metallic material is incorporated into the outer wall, the top and the bottom to increase the difficulty of penetration through the surface housing.

9 Claims, 4 Drawing Figures

WELLHEAD SECURITY APPARATUS

TECHNICAL FIELD

The present invention relates to security apparatus, and more particularly to a well head security apparatus to prevent theft of well head valving by preventing disassembly of the connecting flanges.

BACKGROUND ART

Well head distribution valving (known in the trade as a Christmas tree) are normally located in secluded unattended locales that render them susceptible to theft. Some of the valves of a Christmas tree are easily disconnected by removing the bolts on one of the mounting flanges and lifting the valves off the well head. This type of theft results in a substantial loss of time before new valving can be installed in addition to the cost of the valves itself. In view of this problem there exists a need to discourage potential thieves from removing wellhead valves by preventing access to the mounting flange bolts.

The present invention provides a potential solution to this problem by providing a security apparatus that totally encloses the mounting flange that is locked in place such that destruction of the apparatus is required to attain access to the mounting flange. This destruction requires additional tools and effort by potential thieves.

DISCLOSURE OF INVENTION

The present invention describes a well head security apparatus for preventing theft of the valve portion of the well head. The apparatus comprises a housing having two halves that join together to circumferentially enclose a mounting flange. The two halves are permanently joined together by means of a locking mechanism thereby forming a permanent enclosure that requires destruction of the housing to attain access to the flange mounting bolts.

BRIEF DESCRIPTION OF THE DRAWINGS

For a more complete understanding of the present invention and the advantages thereof, reference is now made to the following detailed description taken in conjunction with the accompanying drawings, in which.

DETAILED DESCRIPTION OF THE INVENTION

Figure 1:
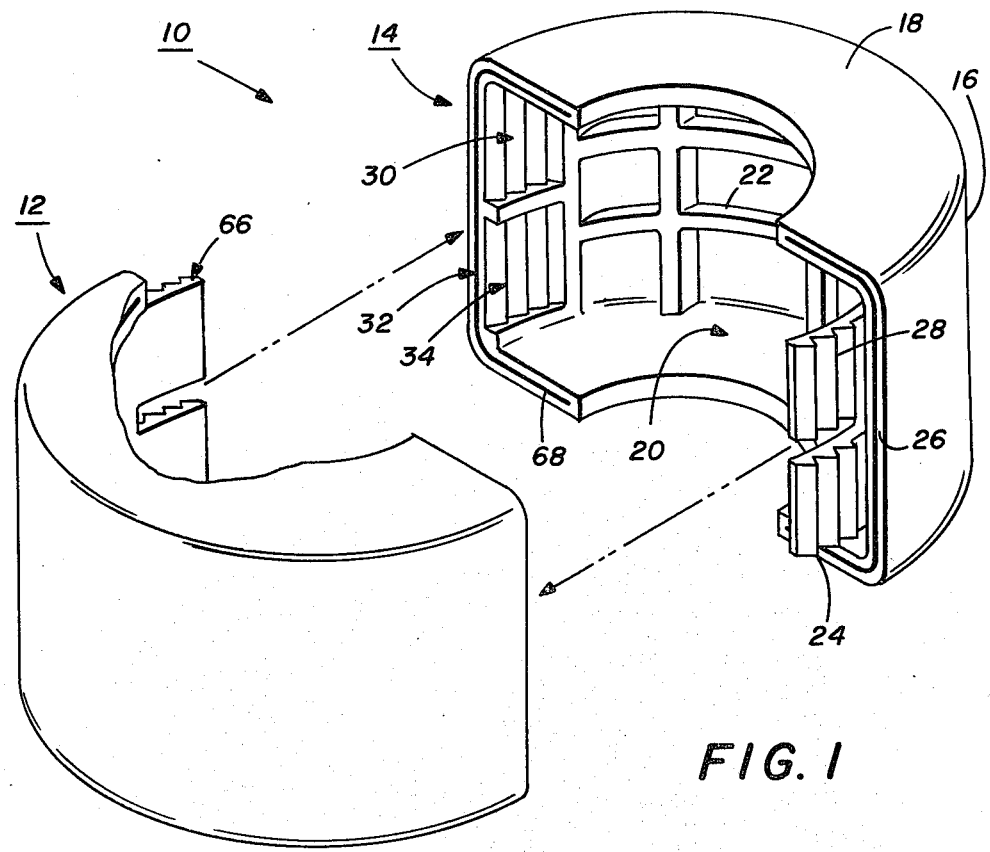
FIG. 1 is an exploded perspective view of one embodiment of the present invention.

Referring to the drawings in particular, the invention comprises a housing 10 as shown in FIG. 1 having a left half 12 and an identical right half 14. The housing 10 is constructed of an impact resistant plastic material, such as nylon, PBT, and PET. It should be understood that the description of the right half 14 is sufficient to describe the left half 12.

The right half 14 is comprised of a semicylindrical outer wall 16, a semiannular top edge 18, and a semiannular bottom edge 20. A network of supporting splines 22 are integrally formed as a part of the interior side of wall 16 and protruding radially inward to provide structural strength to wall 16. A plurality of locking members 24, fabricated of flexible material, are integrally attached to the interior side of wall 16 adjacent to a first lateral edge 26 of wall 16. Each of the locking members 24 extend perpendicular to the edge 26 and in the same plane of curvature as wall 16. The exterior surface of each of the locking members 24 is comprised of a plurality of ridges 28 that are parallel to edge 26.

A locking receptacle 30 is integrally attached to the inner side of wall 16 adjacent to a second lateral edge 32 that is diametrically opposite to the first lateral edge 26. The surface of the locking receptacle 30 is comprised of a plurality of ridges 34 parallel to edge 32 and extending radially inward with respect to wall 16.

Additionally, as shown in FIG. 1, an inner core 68, fabricated of a metallic material is incorporated in the outer wall 16, top 18 and bottom 20 to increase the difficulty of penetration through the surface of housing 10. It will be understood that the inner core 68 need not encircle the outer wall 16 or the top 18 but may be limited to the areas of the locking members 24 and the locking receptacle 30. This inner core provides improved protection against the unauthorized removal of the security apparatus.

Figure 2:
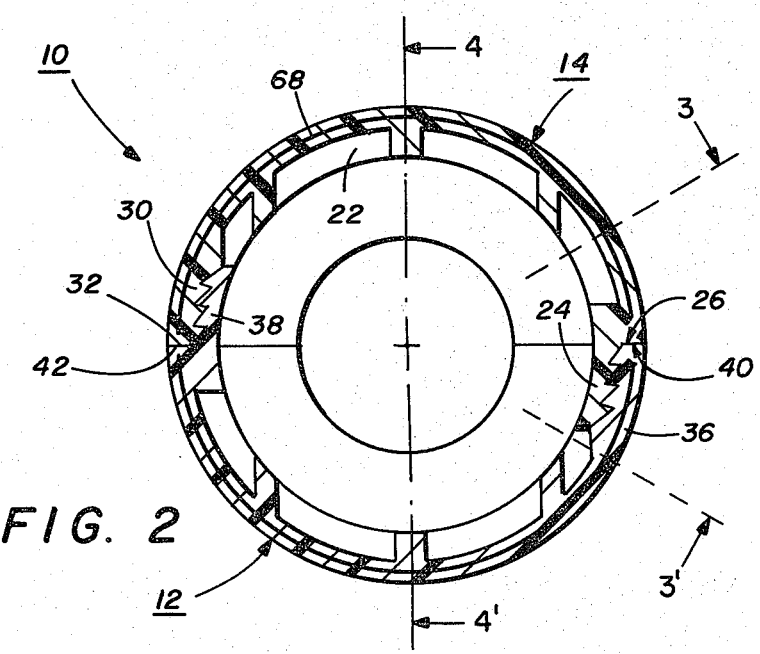
FIG. 2 is a cross-sectional view of the present invention.

Referring now to FIG. 2, the right half 14 is joined with the left half 12 to form a complete housing 10. The left half 12 is oriented with respect to the right half 14 such that each of the locking members 24 of right half 14 interlock with the locking receptacle 36 of left half 12 and each of the locking members 38 of left half 12 interlock with the locking receptacle 30 of right half 14. The first lateral edge 26 of right half 14 is adjacent to the second lateral edge 40 of left half 12 and the second lateral edge 32 of right half 14 is adjacent to the first lateral edge 42 of left half 12. It should be understood that locking members 38 are identical to locking members 24 and locking receptacle 30 is identical to locking receptacle 36.

Figure 3:
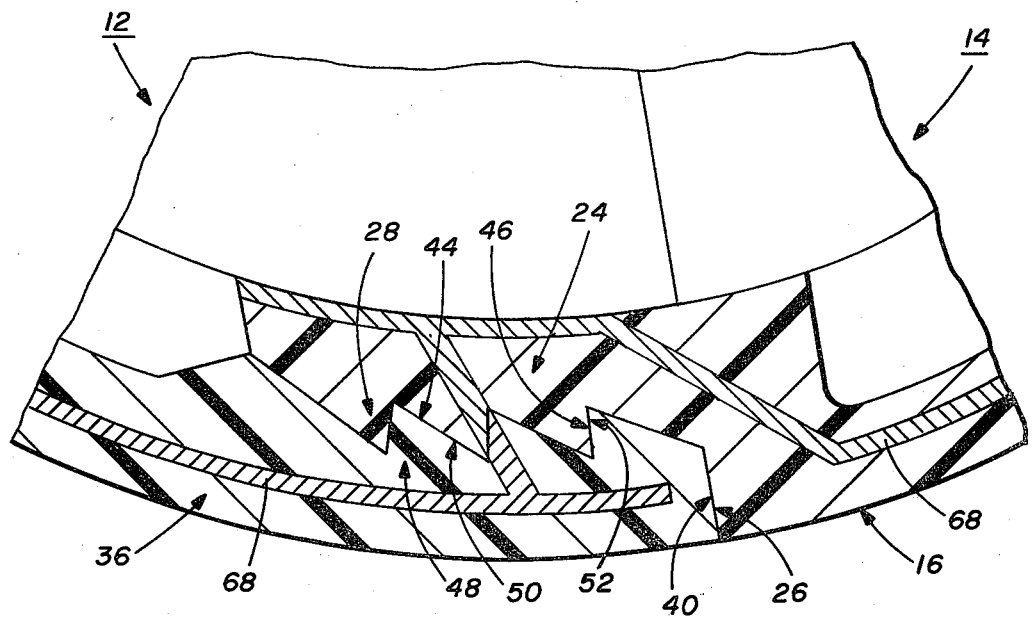
FIG. 3 is an expanded sectional view taken along line 3-3' of FIG. 2.

As shown in FIG. 3, each of the ridges 28 on each of the locking members 24 are cross-sectionally triangular in shape. Each of the ridges 28 has a sliding surface 44 and a retaining surface 46 corresponding to a side of the triangular shape. The locking receptacle 36 of left half 12 is comprised of a plurality of ridges 48 that are identical to the ridges 28 of right half 14 and having a sliding surface 50 and a corresponding retaining surface 52.

When the plurality of locking members 24 are inserted into locking receptacle 36, sliding surface 50 of each of the ridges 48 will exert a force on each of the locking members 24 directed radially inward with respect to wall 16. Each of the locking members 24 will flex radially inward with respect to outer wall 16 allowing the apex of each of the ridges 28 to slide past the apex of each of the ridges 48. Insertion of the locking members 24 into locking receptacle 36 is complete when the edge 26 is adjacent to edge 40.

Retraction of the locking members 24 from the locking receptacle 36 is prevented by the perpendicular force exerted by each of the retaining surfaces 52 on each of the retaining surfaces 46.

Figure 4:
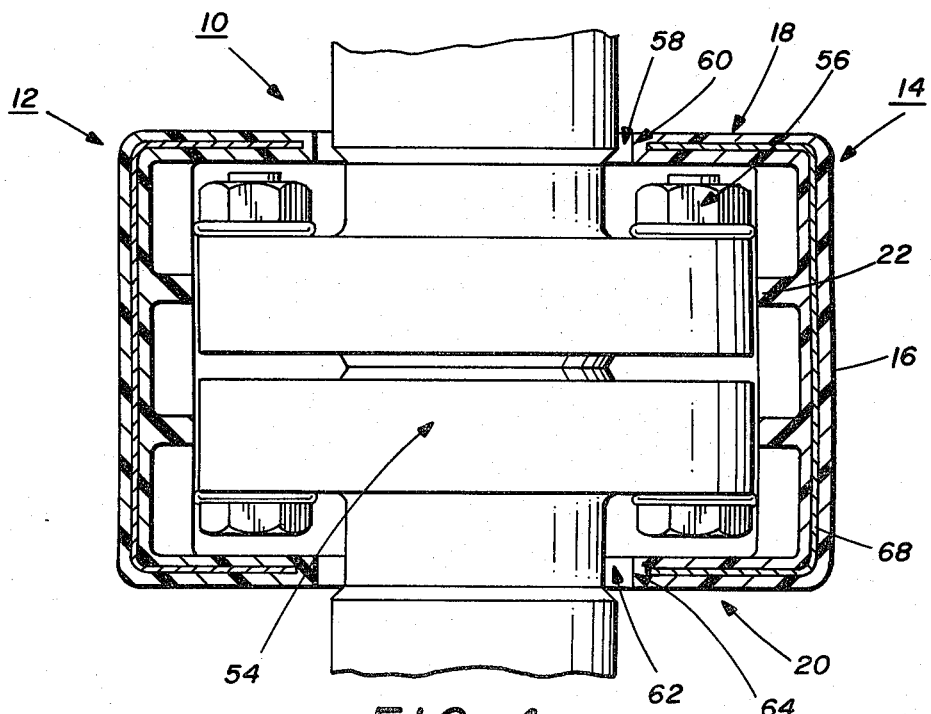
FIG. 4 is a cross-sectional view of the security apparatus taken along line 4-4' of FIG. 2 showing the protected device in place.

As shown in FIG. 4, the right half 14 is joined together with the left half 12 to form a complete enclosure about a flange 54. The annular top 18 and the annular bottom 20 of right half 14 overlie a flange bolt 56. A gap 58, formed by the edge 60 of top 18 and the flange 54, is sufficiently narrow to deny access to the flange bolt 56 without destruction of the housing 10. A gap 62, identical to gap 58, is formed by edge 64 of bottom 20 and flange 54 and denies access to flange bolt 56. The splines 22 rest adjacent to the lateral side of the flange 54 and prevent any horizontal movement that would increase or decrease the dimension of gap 62 and gap 58.

Although one embodiment of the invention has been illustrated in the accompanying drawings and described in the foregoing detailed description, it will be understood that the invention may be embodied otherwise without departing from such principles.

We claim:

1. A well head security apparatus comprising a housing having a first half and a second half, said first half and said second half being similar, each said half fabricated of an impact resistance plastic material, said housing having locking means for securing said halves together and a metallic core for providing additional protection against the unauthorized removal of the security apparatus wherein disassembly of said housing requires the destruction of said locking means.

2. A well head security apparatus, comprising a housing having a first half and a second half, said first half and said second half being similar, each said half constructed of an impact resistant plastic material and having:
   (a) an outer wall comprised of an upper edge, a lower edge, a first lateral edge and a second lateral edge, said second lateral edge diametrically opposite to said first lateral edge,
   (b) a semiannular top attached to said upper edge of said outer wall,
   (c) a semiannular bottom attached to said lower edge of said outer wall,
   (d) locking means having,
      (i) a flexible locking member integral to said first lateral edge of said outer wall, and extending perpendicularly therefrom and
      (ii) a flexible locking receptacle for receiving said locking member integral to the inner peripheral surface of said outer wall and adjacent to said second lateral edge of said outer wall, and
   (e) reinforcing means including a metallic strip incorporated in said outer wall, said top and said bottom of each half for providing additional protection against the unauthorized removal of the security apparatus, wherein when said locking member of said first half interlocks with said locking receptacle of said second half, said locking member of said second half interlocks with said locking receptacle of said first half forming an enclosure of a well head flange.

3. A well head security apparatus as defined in claim 2, wherein said locking means comprises a plurality of locking members that perpendicularly protrude from said first lateral edge of said outer wall.

4. A well head security apparatus as defined in claim 2, wherein:
   (a) said locking member extends in the same plane of curvature as said inner peripheral surface of said outer wall, said locking member having a plurality of ridges parallel to said first lateral edge, said ridges directed radially outward with respect to said outer wall, and
   (b) said locking receptacle having a plurality of ridges parallel to said second lateral edge, said ridges directed radially inward with respect to said outer wall.

5. A well head security apparatus, as defined in claim 4, wherein each of said plurality of ridges has a cross-sectional triangular shape, each of said ridges having a sliding edge and a retaining edge, said retaining edge of each of said ridges of said locking member meshing with said retaining edge of each of said ridges of said locking receptacle to form an interlock.

6. A well head security apparatus for preventing theft of well head valving, comprising a housing having a first half and a second half, said first half and said second half being identical, each said half constructed of an impact resistant plastic material and having:
   (a) an outer wall comprised of an upper edge, a lower edge, a first lateral edge and a second lateral edge, said second lateral edge diametrically opposite to said first lateral edge, said outer wall having a network of support splines on its inner peripheral surface for providing strength to said outer wall,
   (b) a semiannular top attached to said upper edge of said outer wall,
   (c) a semiannular bottom attached to said lower edge of said outer wall,
   (d) locking means having,
      (i) a flexible locking member integral to said first lateral edge of said outer wall and extending perpendicularly therefrom, said locking member extending in the same plane of curvature as said inner peripheral surface and having a plurality of ridges parallel to said first lateral edge, said ridges directed radially outward with respect to said outer wall, and
      (ii) a flexible locking receptacle for receiving said locking member integral to said inner peripheral surface of said outer wall and adjacent to said second lateral edge of said outer wall, said locking receptacle having a plurality of ridges parallel to said second lateral edge, said ridges directed radially inward with respect to said outer wall, and
   (e) reinforcing means comprising a metallic strip incorporated in said outer wall, said top and said bottom of each half adjacent said locking means for providing additional protection against the unauthorized removal of the security apparatus wherein disassembly of said housing requires destruction of said locking mechanism.

7. A well head security apparatus, as defined in claim 6, wherein each of said plurality of ridges has a cross-sectional triangular shape, each of said ridges having a sliding edge and a retaining edge, said retaining edge of each of said ridges of said locking member meshing with said retaining edge of each of said ridges of said locking receptacle to form an interlock.

8. A well head security apparatus, as defined in claim 6, wherein said locking means comprises a plurality of locking members each of which protrude perpendicularly from said first lateral edge of said outer wall.

9. A well head security apparatus, as defined in claim 8, wherein said locking means also includes a plurality of locking receptacles for receiving said plurality of locking members.

* * * * *